Figure 7:
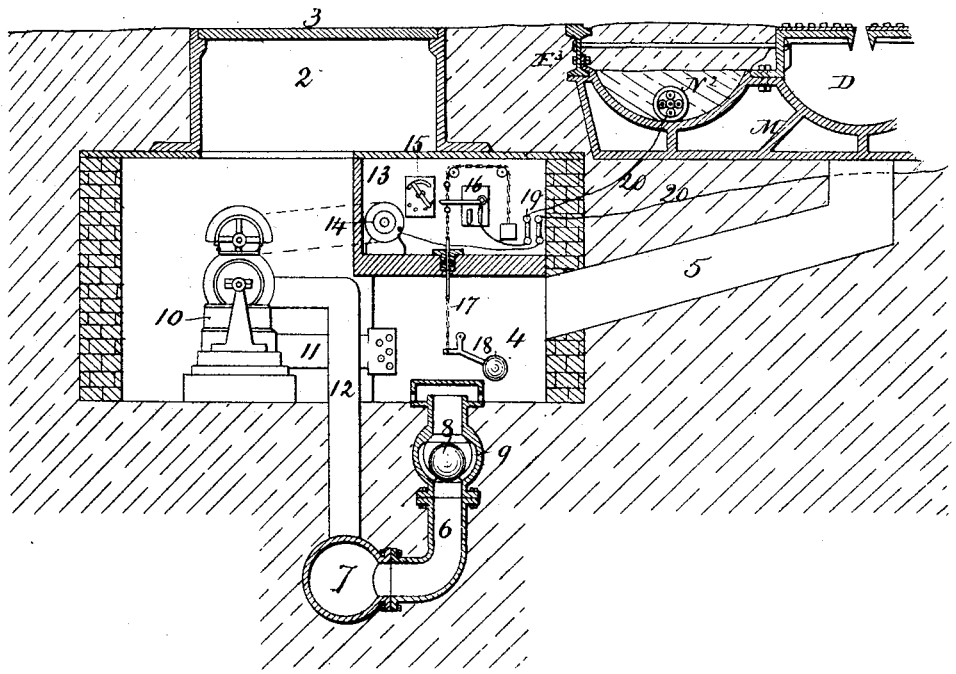

(No Model.) 2 Sheets—Sheet 1.
W. T. DULANY, Jr.
ELECTRIC RAILWAY CONDUIT.
No. 535,324. Patented Mar. 5, 1895.
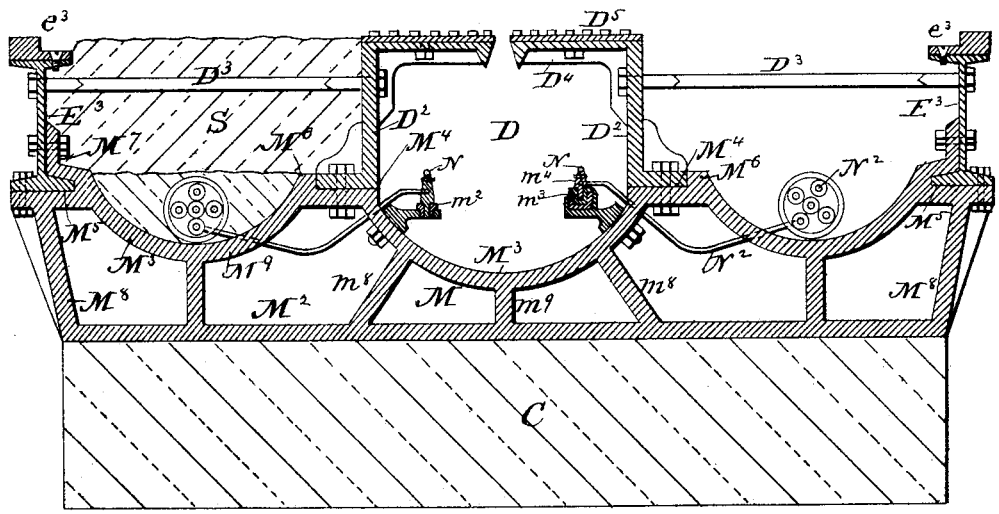
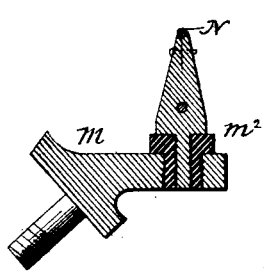
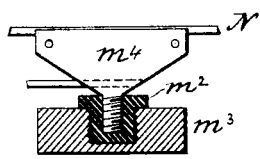
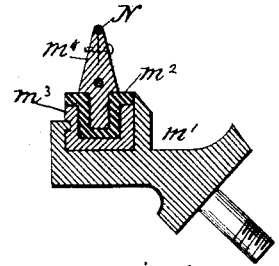
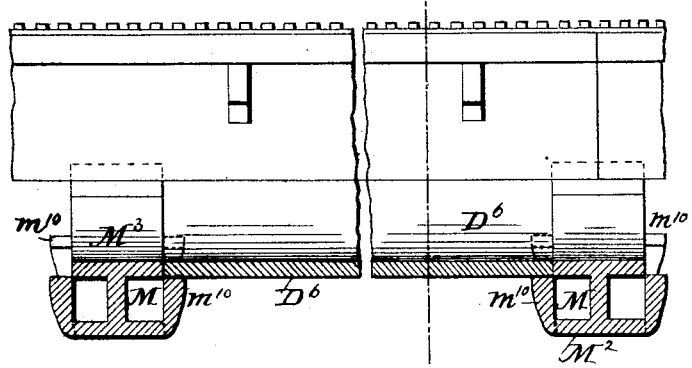
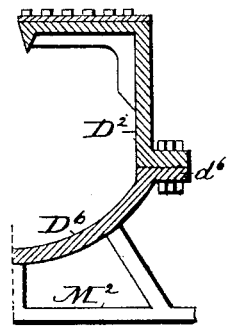
WITNESSES
L. D. Heinrichs
A. B. Driggs
INVENTOR
William T. Dulany Jr.
by E. E. Masson, Attorney (No Model.) 2 Sheets—Sheet 2.

W. T. DULANY, Jr.
ELECTRIC RAILWAY CONDUIT.

No. 535,324. Patented Mar. 5, 1895.

WITNESSES
A. B. Diggs
L. D. Heinrichs

INVENTOR
William T. Dulany Jr.
by E. E. Masson, Attorney.

UNITED STATES PATENT OFFICE.

WILLIAM TASKER DULANY, JR., OF NEW YORK, ASSIGNOR OF ONE-HALF TO OSCAR F. SHAW, OF BROOKLYN, NEW YORK.

ELECTRIC-RAILWAY CONDUIT.

SPECIFICATION forming part of Letters Patent No. 535,324, dated March 5, 1895.

Application filed December 14, 1894. Serial No. 531,824. (No model.)

*To all whom it may concern:*

Be it known that I, WILLIAM TASKER DULANY, Jr., a citizen of the United States, residing at New York city, in the county of New York, State of New York, have invented certain new and useful Improvements in Electric-Railway Conduits, of which the following is a specification, reference being had therein to the accompanying drawings.

The objects of my invention are to provide an electric railway conduit of great strength, but simple in construction, provided with two conductors, or trolley wires placed within the conduit, and insulated therefrom, and electric cables supported upon inverted metal arches of yoke-plates—constituting parts of the conduit, and also the supports, for the track-rails; and in connection with said yoke-plates, a series of earthenware or "insulated fiber" endless troughs resting on the yoke-plates and forming the bottom of the conduit, and angle plates forming the top thereof. I attain these objects by the construction illustrated in the accompanying drawings, in which—

Figure 1, is a transverse vertical section of the track and conduit through one of the yoke-plates, showing the two trolley wire conductors within said conduit, and the feeder cables of the conductors on the outside of the conduit proper. Figs. 2 and 3, are transverse vertical sections on a larger scale of the conductors supporting brackets, carrying insulators and conductors clamp. Fig. 4, is a side view of the conductor plant and insulator, shown in Fig. 3. Fig. 5, is a central longitudinal section of a portion of the conduit through the earthenware trough-bottom, and two of the yoke-plates. Fig. 6, is a transverse vertical section of one-half of the conduit through the earthenware trough-bottom. Fig. 7 is a transverse vertical section of a portion of the conduit through one of the yoke plates, showing one of the drain pipes of the conduit leading to a cess-pool and a pipe from the latter leading into a sewer, and within said pipe a float ball valve or check valve to prevent backing up of the sewer water into the conduit. Above the cess-pool is represented an electric motor, a controller, and an automatic switch actuated by the float or valve, and on a lower level than said motor and connected therewith, a pump having its suction pipe leading from the cess-pool and its discharge pipe leading into the sewer.

In said drawings M represents one of the yoke-plates to support the track rails, and the combined side and top, or angle plates of the conduit. Said yokes are of cast iron, and are made to rest upon a concrete foundation "C" of suitable depth. They consist of a horizontal bottom plate, $M^2$ and a top plate, $M^3$, made integral therewith and curved in the form of three inverted arches, with intervening horizontal surfaces $M^4$ between them to constitute flat supports for the angle plates $D^2$ of the conduit proper D, and horizontal surfaces $M^5$ at the ends to support the I-shaped track girders $E^3$ on the top of which are secured the track rails $e^3$, although the top of these may also constitute the track rails as shown in Fig. 7. Adjacent to the surfaces $M^4$ the top plate $M^3$ has standing lugs $M^6$ to prevent the angle plates $D^2$ from being spread abnormally, from which would result an enlargement of the slot of the conduit. Adjacent to the inner end of the surfaces $M^5$, the top plate $M^3$, has lugs $M^7$ the lower portion of which covers the flanged foot of the girders $E^3$, and the upper vertical portion forms a side rest for the web of said girders. Said web is bolted to the lugs $M^7$, and the outer flange of the girders is bolted to the top plate $M^3$. The foot of each angle plate $D^2$ is bolted also to said top plate, and its upper portion is connected by means of bracing-bolts $D^3$ with the web of the girders. The horizontal upper flange of each plate $D^2$ has adjacent to the slot of the conduit a pendent flange to reinforce it in that locality, and angular bracket-ribs $D^4$ on its under side to strengthen it, and upon its top it is provided with wearing plates $D^5$ having preferably a serrated top surface, and secured to the upper flange of the plate $D^2$ by bolts passing through holes of sufficiently large diameter to permit longitudinal expansion of the plates $D^5$.

The top plate $M^3$ of the yoke, is connected to, and supported by the bottom plate $M^2$ by slightly inclined end plates $M^8$, intermediate braces $m^8$ and a central brace, $m^9$ integral therewith. The yoke-plates M of the conduit are (alongside of the braces $m^8$ and $m^9$) provided with brackets $m^{10}$ integral therewith to support the ends of the molded and kiln dried earthenware trough-like bottom $D^6$ of the conduit. Said troughs have horizontal flanges $d^6$ on their sides that are bolted to the bottom flange of the angle plates $D^2$ with the interposition of cement or other packing between them to render the joint water tight if desired, the ends of the troughs $D^6$ being embedded in melted sulphur, or cemented to the yoke-plates and to the ends of each other if made to rest upon the body of the yoke-plates so as to make a water tight connection, the intention being thereby to completely insulate the bottom of the conduit from the metal yoke-plates and to prevent the infiltration of any water or moisture into the conduit from the surrounding earth, and also to prevent any water which may fall into the conduit from coming into contact with the yoke-plates. Said troughs may also be made of "insulating fiber," which consists of sheets of paper pasted together and soaked or boiled in a compound of asphaltum and other mineral substances that render it water-proof.

The bottom of the conduit is connected at intervals with the city sewerage system for the purpose of draining it, and if located near tide-water, where the backing up of the water, and flooding of the conduit is to be provided against, I use suitable flood valves attached to, and placed in the sewer connections which are used in conjunction with hydraulic force pumps, electrically connected to, and into the conduit circuits through suitable switches, controlled and started by a float placed in the cesspool into which the conduit is drained. This construction is represented in Fig. 7 which shows alongside of the conduit and track, an underground chamber covered by a man-hole frame 2 and its cover 3. Within said chamber there is partitioned off the cess-pool 4 into which drainage water is received from the conduit D through the pipe 5. From the cess-pool the water generally flows by gravity through the pipe 6 to the sewer 7; but to prevent the backing up of the sewer water into the cess-pool and thence into the conduit, a float ball valve 8 is placed in a valve chamber 9 mounted upon the pipe 6, the valve 8 normally resting upon a spider or ribs formed on the interior of the valve chamber 9. To remove the water that may be flowing into the cess-pool 4 while its ordinary discharge pipe 6 is closed by the valve 8, a suitable pump is located in the underground chamber alongside of said cess-pool or in a room at a short distance therefrom, its suction pipe 11 entering the bottom portion of the cess-pool, while its discharge pipe 12 leads directly into the sewer 7 beyond the bottom of the valve chamber. Alongside of the pump, there is a chamber 13 that is constructed substantially water tight and contains an electric motor 14 connected by a chain belt with the pump, an electric regulator 15, and an automatic electric switch 16 of suitable construction, the latter having a pivoted arm the outer end of which is in the path of a chain 17 carrying two operating knobs, and a weight at one end. The upper portion of said chain passes over two guide pulleys and has its opposite end attached to the pivoted arm of a float 18, a portion of said chain 17 consisting of a rod that passes through a stuffing box in the floor of the motor chamber to prevent water from the cesspool from entering the motor chamber. The power to actuate the motor and its adjuncts is preferably taken from the cables $N^2$ to terminals or testing underground boxes and thence through ordinary fuse plugs 19 upon the incased wires 20 as shown.

To the yoke-plates M of the conduit, are attached brackets $m$ and $m'$, the inner ends of which project within the conduit and support insulators $m^2$ carried in movable blocks $m^3$, Figs. 3 and 4, and said insulators carry clamps $m^4$ for the trolley conductors N. The feeder conductors $N^2$ that carry the electric current from the power station to each section of the trolley conductors of the underground system, are carried upon the inverted side arches $M^9$ of the yoke-plates, over which any suitable pavement S is laid.

Having now fully described my invention, I claim—

1. In an electric railway conduit the combination of yoke-plates having a flat bottom, and a top integral therewith consisting of a central inverted arch and two lateral inverted arches with horizontal surfaces $M^4$ between them, angle plates $D^2$ bolted to the yoke plates upon the surfaces $M^4$, flat surfaces $M^5$ at the ends of the yoke plates, I-beams $E^3$ secured upon the surfaces $M^5$ and rails $e^3$ secured on top of the beams $E^3$, the lateral inverted arches constituting supports for the feeder cable conductors of the conduit substantially as shown and described.

2. In an electric railway conduit the combination of yoke-plates having a flat bottom, and a top integral therewith having a central inverted arch with horizontal surfaces $M^4$ alongside of said arch, and upon said surfaces, angle plates $D^2$ bolted thereto, with molded and artificially dried troughs $D^6$ having lateral flanges $d^6$, said troughs having their ends resting upon the yoke plates and their lateral flanges secured to the angle plates substantially as described.

3. In an electric railway conduit having a drainage cess-pool connected therewith, the combination of the cess-pool discharge pipe 6, having a float-check valve therein, an electrically operated pump having its suction pipe within said drainage cess-pool and means as described whereby said pump is automatically started and stopped by variations in the level of the water in said drainage cess-pool above the float check valve substantially as described.

4. In an underground electric railway conduit the combination of a drainage cess-pool for said conduit, a pipe leading from said cess-pool to a sewer, a float check valve within said pipe, an electrically operated pump having its suction pipe within said cess-pool and its discharge pipe leading into said sewer beyond the float check valve, a float within the cess-pool and means as described connected with said float whereby said pump is automatically started and stopped by variations in the level of the water in said cess-pool substantially as described.

In testimony whereof I affix my signature in presence of two witnesses.

WILLIAM TASKER DULANY, Jr.

Witnesses:
   OSCAR F. SHAW,
   DAVID A. STORER.